(12) United States Patent
Maehashi et al.

(10) Patent No.: US 12,734,864 B2
(45) Date of Patent: Sep. 15, 2026

(54) OPTICAL COMPONENT AND LIGHT CONTROL DEVICE USING THE OPTICAL COMPONENT

(71) Applicant: Nissan Motor Co., Ltd., Yokohama (JP)

(72) Inventors: Ryota Maehashi, Kanagawa (JP); Yoshimi Ohta, Kanagawa (JP); Fuminori Satou, Kanagawa (JP); Maki Shimada, Kanagawa (JP); Shunta Nabetani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 144 days.

(21) Appl. No.: 18/857,865

(22) PCT Filed: Mar. 24, 2023

(86) PCT No.: PCT/JP2023/011835
§ 371 (c)(1),
(2) Date: Oct. 18, 2024

(87) PCT Pub. No.: WO2023/203966
PCT Pub. Date: Oct. 26, 2023

(65) Prior Publication Data

US 2026/0184145 A1 Jul. 2, 2026

(30) Foreign Application Priority Data

Apr. 21, 2022 (JP) ................................ 2022-070284

(51) Int. Cl.
*B60J 3/04* (2006.01)
*G02F 1/01* (2006.01)
*G02F 1/1335* (2006.01)

(52) U.S. Cl.
CPC .............. *B60J 3/04* (2013.01); *G02F 1/0126* (2013.01); *G02F 1/133524* (2013.01)

(58) Field of Classification Search
CPC ...... B60J 3/04; G02F 1/0126; G02F 1/133524
See application file for complete search history.

(56) References Cited

U.S. PATENT DOCUMENTS

2014/0327949 A1* 11/2014 Gross ........................ E06B 9/24 359/244
2019/0121007 A1* 4/2019 Chen ................... G02B 6/0056

(Continued)

FOREIGN PATENT DOCUMENTS

CN 205942162 U * 2/2017
JP 6287487 B2 3/2018
JP 2018-97871 A 6/2018

*Primary Examiner* — Tracie Y Green
(74) *Attorney, Agent, or Firm* — Spencer Fane LLP

(57) ABSTRACT

An optical component has an optical functional layer with variable light transmittance disposed between multiple light guide plates. The optical functional layer has a main surface provided with a light-receiving section that receives a control light that causes the light transmittance of the optical functional layer to change, and an end surface provided with a light leakage prevention section that reflects the control light. The light-receiving section includes a transmission type diffraction grating. A non-transmissive section that absorbs or reflects the control light is provided between the light guide plates in a path of a zero-order light of the control light transmitted through the transmission type diffraction grating. With this structure, an optical component and a light control device can be provided in which deterioration of the non-transmissive section is prevented and the control light is not visible from either the control light irradiation side or the opposite side.

7 Claims, 1 Drawing Sheet

(56) References Cited

U.S. PATENT DOCUMENTS

2022/0228722 A1* 7/2022 Nishikawa .............. F21V 5/002
2025/0172845 A1* 5/2025 Shimada ............. G02F 1/13345

* cited by examiner

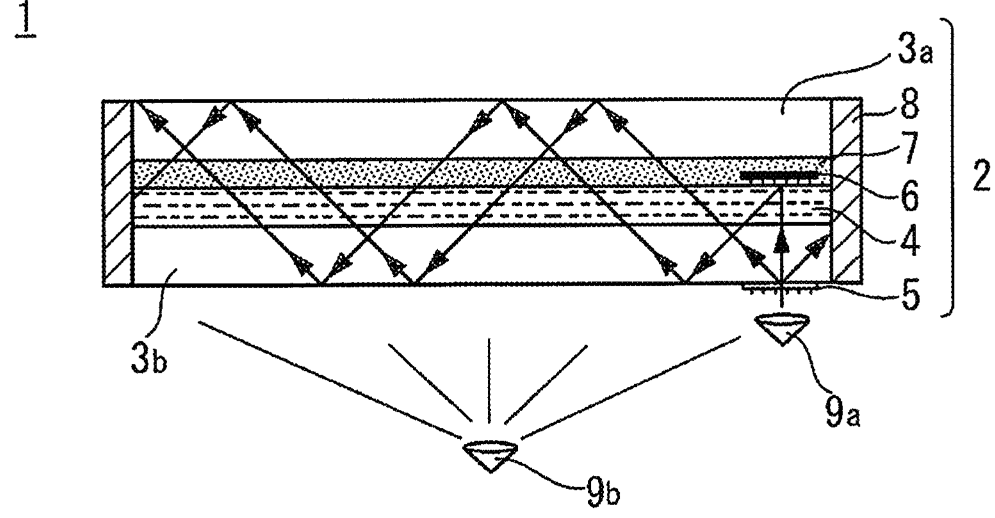
1
3a
8
7
6
2
4
5
3b
9a
9b

OPTICAL COMPONENT AND LIGHT CONTROL DEVICE USING THE OPTICAL COMPONENT

CROSS-REFERENCE TO RELATED APPLICATIONS

This application is a U.S. national stage application of International Application No. PCT/JP2023/011835, filed on Mar. 24, 2023, which claims priority to Japanese Patent Application No. 2022-070284.

BACKGROUND

Technical Field

The present invention relates to an optical component and a light control device using the optical component and, more specifically, to an optical component having an optical functional layer whose light transmittance changes with light energy, and to a light control device using the optical component.

Background Information

Optical components, whose light transmittance can be changed by means of control light such as visible light or ultraviolet light, are known and used in the window glass of vehicles and buildings; the optical components may be colored to adjust the amount of sunlight entering the vehicle or room, or clouded for use in displaying vehicle information or to perform other types of display functions by projecting visible light onto the optical components.

When visible light is irradiated from the outside toward the optical component in order to vary the light transmittance of the optical component, the control light is visible due to transmission or reflection at the surface of the optical component; thus, in order to control the light transmittance, it is preferable that the visible control light be irradiated onto an end surface of the optical component and guided in the in-plane direction thereof.

However, the end surfaces of window glass in vehicles and buildings are often fastened, which makes it difficult to irradiate and guide the control light from the end surfaces.

Although unrelated to optical components with variable light transmittance, Japanese Patent No. 6,287,487 (Patent Document 1) discloses a method of irradiating light in the thickness direction of a light guide, i.e., on a portion of a first face of the light guide, and diffracting this light with a transmission type diffraction grating and a reflection type diffraction grating to guide the light in the in-plane direction of the light guide.

SUMMARY

In the invention described in Patent Document 1, the reflection type diffraction grating is provided in a path of a zero-order light transmitted through the transmission type diffraction grating, and the light irradiated onto the light guide does not pass through to the opposite side of the light guide.

However, since the reflection type diffraction grating is provided outside the light guide, if the optical component is used outdoors, the reflection type diffraction grating tends to deteriorate and over time the irradiated light passes through the light guide and becomes visible from the opposite side.

The present invention has been devised in consideration of this problem of the prior art and has as an object to provide an optical component that prevents the control light from becoming visible from the opposite side even if the optical component is used outdoors, and a light control device using this optical component.

Having undertaken diligent study to achieve the above object, the inventor found that the object could be realized by providing a non-transmissive section that absorbs or reflects control light inside an optical component, which led to the completion of the present invention.

That is, the optical component of the present invention is provided with an optical functional layer with variable light transmittance between a plurality of light guide plates. The optical functional layer has main surface provided with a light-receiving section that receives a control light that causes the light transmittance of the optical functional layer to change, the light-receiving section includes a transmission type diffraction grating, and a non-transmissive section that absorbs or reflects the control light is provided between the light guide plates in a path of a zero-order light of the control light transmitted through the transmission type diffraction grating, diffracting and guiding the control light in the in-plane direction of the optical component.

Further, the light control device of the present invention has the optical component and a light source that emits a plurality of types of control light of various wavelengths. At least one type of the control light is visible light, wherein the visible light enters the optical component through the transmission type diffraction grating from the light-receiving section provided on the main surface of the optical component.

According to the present invention, since the non-transmissive section that absorbs or reflects the control light is provided inside the optical component, it is possible to provide an optical component and a light control device capable of preventing the deterioration of the non-transmissive section and of preventing the control light from being visible not only from the irradiation side but also from the opposite side.

BRIEF DESCRIPTION OF THE DRAWINGS

Referring now to the attached drawing which forms a part of this original disclosure, a selected FIGURE is illustrated.

FIG. 1 shows a schematic diagram of an example of the light control device of the present invention.

DETAILED DESCRIPTION OF EMBODIMENTS

The optical component of the present invention will now be described in detail. As shown in FIG. 1, the optical component of the present invention is provided with an optical functional layer with variable light transmittance between a plurality of light guide plates. In response to ultraviolet light or visible light, the optical state and light transmittance of the optical functional layer change between a transparent state and a colored state, or between a transparent state and a clouded state.

The main surface of the optical component has a light-receiving section that causes the light transmittance of the optical functional layer to change, and this light-receiving section is provided with a transmission type diffraction grating.

The control light entering the optical component from the light-receiving section is scattered inside the optical component due to the transmission type diffraction grating, and part of the scattered light is directed substantially in the in-plane direction.

The control light is scattered in a direction that exceeds the critical angle between the light guide plate and air, i.e., the control light incident at the light guide plate/air interface is at an angle that exceeds the angle of incidence at which total reflection occurs at the interface is not emitted outside of the optical component due to total internal reflection at the above-mentioned interface caused by the difference between the refractive indices of the light guide plate and air.

Since the optical component of the present invention is formed with the same light guide plates on both sides, total internal reflection of the control light occurs on both sides of the optical component.

Specifically, as indicated by the arrows in FIG. 1, the control light that is reflected at the interface of the light guide plate on one side and travels toward the light guide plate on the other side enters and is reflected at the interface of the light guide plate on the other side at the same angle as the angle of incidence at the interface of the light guide plate on the first side, and then once again enters and is reflected at the interface of the light guide plate on the first side at the same angle.

Thus, the control light entering the optical component is repeatedly reflected at the interfaces on both sides of the optical component, guided in an in-plane direction of the optical component, and causes the optical state of the optical functional layer to change.

Further, since the zero-order light of the control light transmitted through the transmission type diffraction grating has no diffraction pattern, this light normally passes directly to the opposite side of the optical component; however, as shown in FIG. 1, the optical component of the present invention has a non-transmissive section that absorbs or reflects the control light in a path of a zero-order light.

Therefore, even if the control light is visible light, the zero-order light of the control light is prevented from being visible from the opposite side of the optical component.

Further, since the non-transmissive section is provided between the light guide plates and is not exposed to the outside, even if the optical component were to be used outdoors, the non-transmissive section would not be exposed to wind, rain, or dirt, thereby preventing deterioration of the non-transmissive section and ensuring that the control light is not visible from either the irradiation side or the opposite side over a long period of time. Moreover, as long as the non-transmissive section is disposed between the light guide plates, the non-transmissive section may be provided on either side of the optical functional layer.

The optical component preferably has ultraviolet light absorption capability; the light guide plates themselves may absorb ultraviolet light, or an ultraviolet light-absorbing layer may be provided between the light guide plates. When an ultraviolet light-absorbing layer is provided between the light guide plates, the ultraviolet light-absorbing layer is typically provided on the side on which sunlight enters, in a position farther from the transmission type diffraction grating than the non-transmissive section.

Using ultraviolet light absorption layers or light guide plates with ultraviolet light absorption capability can prevent not only changes in the optical state of the optical functional layer due to sunlight, but also deterioration of the non-transmissive section due to the ultraviolet light present in sunlight.

The above-mentioned ultraviolet light-absorbing layer is a transparent film containing ultraviolet light absorbers and ultraviolet light reflectors. As the ultraviolet light absorber, conventionally known ultraviolet light absorbers that absorb ultraviolet light of wavelengths up to 400 nm without absorbing visible light and that have minimal coloring properties can be used, such as benzophenone derivatives, salicylate ester derivatives, triazole derivatives, and acrylonitrile derivatives. Examples of ultraviolet light reflectors include titanium dioxide and zinc oxide.

There are no particular restrictions on the non-transmissive section as long as the non-transmissive section does not transmit the control light; for example, black print, a black ceramic, and reflection type diffraction gratings can be used. Reflection type diffraction gratings in particular have a fine grating structure and are very effective in preventing deterioration of the optical component of the present invention, as the desired diffraction would no longer occur if the grating structure were disrupted by deterioration or the accumulation of dirt.

The transmission type and reflection type diffraction gratings are preferably blazed diffraction gratings. Blazed diffraction gratings exhibit maximum diffraction efficiency at specific diffraction orders, where most of the light is confined to a desired diffraction order.

Therefore, as the amount of light distributed to orders other than the desired orders, such as the zero order, decreases, it is possible to efficiently guide the control light in the in-plane direction of the optical component, thereby improving the utilization efficiency of the control light that causes the light transmittance of the optical functional layer to change.

The angle of incidence of the control light diffracted by the reflection type diffraction grating onto the light guide plate, i.e., the angle formed between the light of the diffraction order with the highest diffraction efficiency and a normal line to the light guide plate/air interface, is preferably greater than the critical angle between the light guide plate and air.

Diffracting the control light so as to enter the above-mentioned interface at an angle that exceeds the critical angle between the light guide plate and air causes the control light to undergo total internal reflection at the light guide plate/air interface, thereby preventing the control light from leaking out from the main surface of the optical component and being seen, and at the same time improving the control light utilization efficiency.

Further, the optical component is preferably provided with a light leakage prevention section at an end surface that absorbs or reflects the control light. The provision of a light leakage prevention section prevents the control light from leaking out from the end surface of the optical component.

In particular, if the light leakage prevention section that reflects the control light is provided perpendicularly to the main surface of the optical component, i.e., perpendicular to the light guide plate/air interface, the control light is reflected at the end surface and then guided again to the opposite side in the in-plane direction of the optical component, thereby improving the control light utilization efficiency.

An example of the optical functional layer whose optical state changes between a clear state and a clouded state is a layer containing liquid crystals and azobenzene, and an example of the optical functional layer whose optical state changes between a clear state and a colored state is a layer containing a photochromic material.

The above-mentioned optical functional layer that becomes cloudy changes, with ultraviolet light, into the cis form of azobenzene, which has a bent three-dimensional structure with randomly oriented liquid-crystal molecules that scatter light, thus becoming cloudy; whereas, with visible light, the azobenzene changes into its trans isomer, which has a planar structure with vertically oriented liquid-crystal molecules that transmit light, thus becoming transparent.

Further, the optical functional layer that becomes colored undergoes repeated changes in the photochromic material state with irradiation of light, altering the wavelength of light absorbed depending on the photochromic material state, and thus changing between transparent and colored states.

As the photochromic material, p-type materials, which have a colored and decolored state with exposure to light, and t-type materials, which have a colored state with exposure to light and a decolored state with exposure to heat or light, can be used.

Examples of p-type photochromic materials include diarylethene and fulgide compounds, whereas examples of t-type photochromic materials include azobenzene and spiropyran compounds.

For the light guide plates, materials such as glass or acrylic resin can be used.

The light control device of the present invention comprises the above-mentioned optical component and a light source that emits a plurality of types of control light of various wavelengths which cause the light transmittance of the optical functional layer of the optical component to change.

The control light includes at least one type of visible light which is made incident on the optical component through a transmission type diffraction grating from the light-receiving section provided on the main surface of the optical component in order to control the optical state of the optical functional layer.

Since the control light is not visible when it is ultraviolet light, it need not be incident from the light-receiving section of the optical component, but may be irradiated directly from outside of the optical component onto the entire surface of the optical functional layer in a direction that intersects the optical functional layer.

As the above-mentioned light source, a light source that emits monochromatic light, such as an LED or a semiconductor laser, can be used. Since the diffraction angle at the diffraction grating varies as a function of the wavelength of light, using a monochromatic control light allows the blazed diffraction grating to diffract the control light at a specific angle, thereby improving the light utilization efficiency.

The light control device of the present invention can be used, for example, in vehicle windshields and in shop windows, and switched between a clouded screen state in which visible light images can be projected and displayed, and a transparent state in which the other side is visible, or switched between a colored state and a transparent state to adjust the amount of sunlight entering the vehicle or room.

The present invention will be described in detail below with reference to embodiments, but the present invention is not limited to the following embodiments.

First Embodiment

A transmission type diffraction grating 5 with a grating period of 1600/mm was provided on the surface of a transparent glass 3b (refractive index 1.54), thereby forming a light-receiving section. Additionally, an ultraviolet light-absorbing layer 7 was formed over the entire surface of one side of another transparent glass 3a (refractive index 1.54), and a vertical alignment film (polyimide) was deposited over the entire surface. A reflection type blazed diffraction grating 6 (grating period 1000/mm, $\gamma$=15°) with a metal vapor-deposited surface was provided on this transparent glass in a path of a zero-order light from the transmission type diffraction grating.

A mixture was prepared containing 83.65 wt % of a nematic liquid crystal containing several types of liquid-crystal molecules (Merck: E44); 5.1 wt % of azobenzene molecules represented by structural formula (1); 2.9 wt % of a photo-nonresponsive chiral represented by structural formula (2); 0.1 wt % of an electrolyte (cetrimonium bromide; CTAB); 7.5 wt % of a polymerizable monomer represented by structural formula (3); and 0.75 wt % of a polymerization initiator (IGM Resins B.V.: IRGACURE 819).

Chemical Formula 1

Structural Formula (1)

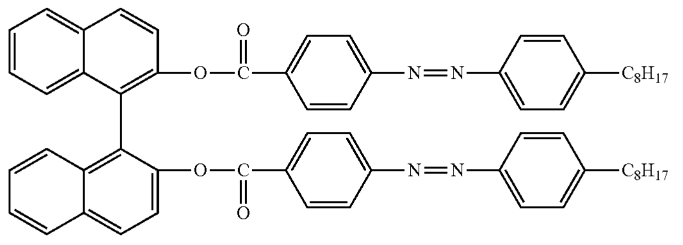

Chemical Formula 2

Structural Formula (2)

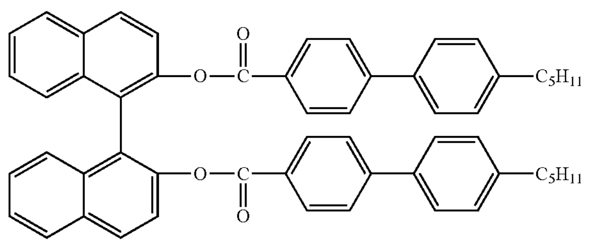

-continued

Chemical Formula 3

Structural Formula (3)

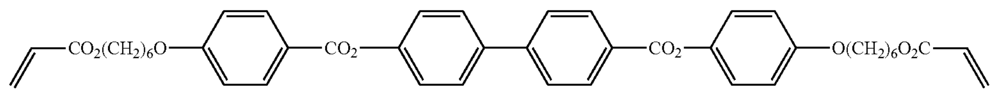

The transparent glass 3b was arranged with the light-receiving section 5 facing outward, and the other transparent glass 3a was arranged with the non-transmissive section 6 facing inward; the liquid mixture was injected between these pieces of transparent glass while being heated. Light with a wavelength of 420-450 nm was irradiated from the side of the light guide plate 3b to polymerize the monomer, thereby forming an optical functional layer 4 between the light guide plates; also, an Ag thin film 8 was formed on the end surface to produce the optical component 2.

A light source 9a emitting a control light (visible light) with a wavelength of 450 nm was provided on the light-receiving section of the optical component and adjusted so that the angle of incidence was 0° relative to the transmission type diffraction grating. Additionally, a light source 9b emitting ultraviolet light was provided on the side of the one transparent glass 3b facing the main surface of the optical component, thus producing the light control device 1 shown in FIG. 1.

In the above-mentioned light control device, the critical angle at the transparent glass/air interface was 42,° the first-order diffraction angle of the transmission type diffraction grating was 50°, and the first-order diffraction angle of the reflection type blazed diffraction grating was 50°; by causing the control light to be incident from the light-receiving section and be guided in the in-plane direction, the optical functional layer was successfully made to cloud. Further, it was confirmed that there was no leakage of control light from the light source 9a to the outside.

Second Embodiment

The light control device was produced in the same manner as in the first embodiment, except that a reflection type diffraction grating (grating period 1600/mm, first-order diffraction angle of 50°) was used instead of the reflection type blazed diffraction type grating to form the non-transmissive section.

Third Embodiment

The light control device was produced in the same manner as in the first embodiment, except that a black ceramic print was used instead of the reflection type blazed diffraction grating to form the non-transmissive section.

Like the first embodiment, the light control devices of the second embodiment and the third embodiment were able to cloud the optical functional layer, and there was no leakage of control light to the outside. Additionally, the speed of clouding of the optical functional layer was fastest in the first embodiment (reflection type blazed diffraction grating), followed by the second embodiment (reflection type diffraction grating), and the third embodiment (black ceramic).

The invention claimed is:

1. An optical component comprising an optical functional layer with variable light transmittance between a plurality of light guide plates, wherein the optical functional layer has a main surface provided with a light-receiving section that receives a control light that causes the light transmittance of the optical functional layer to change, and an end surface provided with a light leakage prevention section that reflects the control light, the light-receiving section includes a transmission type diffraction grating, a non-transmissive section that absorbs or reflects the control light is provided between the light guide plates in a path of a zero-order light of the control light transmitted through the transmission type diffraction grating, and the control light is diffracted and guided in an in-plane direction of the optical component.

2. The optical component according to claim 1, further comprising an ultraviolet light-absorbing layer between the light guide plates, wherein the ultraviolet light-absorbing layer is provided in a position farther from the transmission type diffraction grating than the non-transmissive section.

3. The optical component according to claim 1, wherein the non-transmissive section is formed from a black ceramic or a reflection type diffraction grating.

4. The optical component according to claim 1, wherein the optical component is a vehicle windshield.

5. A light control device comprising the the optical component according to claim 1, and further comprising a light source emitting a plurality of types of control light of various wavelengths, wherein at least one type of the control light is visible light that enters the optical component through the transmission type diffraction grating from the light-receiving section provided on the main surface of the optical component.

6. The light control device according to claim 5, wherein the non-transmissive section of the optical component is formed by a reflection type diffraction grating, and an angle of incidence of the control light, in which the zero-order light of the control light transmitted through the transmission type diffraction grating has been diffracted by the above-mentioned reflection type diffraction grating, onto the light guide plates is greater than a critical angle between the light guide plates and air.

7. A light control device comprising: The light control device according to claim 6, wherein an optical component; and a light source emitting a plurality of types of control light of various wavelengths, wherein the optical component has an optical functional layer with variable light transmittance between a plurality of light guide plates, the optical functional layer has a main surface provided with a light-receiving section that receives a control light that causes the light transmittance of the optical functional layer to change, the light-receiving section includes a transmission type diffraction grating, a non-transmissive section that absorbs or reflects the control light is provided between the light guide plates in a path of a zero-order light of the control light transmitted through the transmission type diffraction grating, the control light is diffracted and guided in an in-plane direction of the optical component, and at least one type of the control light is visible light that enters the optical component through the transmission type diffraction grating from the light-receiving section provided on the main surface of the optical component.

* * * * *